United States Patent
Zimmer

[11] Patent Number: 6,064,298
[45] Date of Patent: May 16, 2000

[54] ANTITHEFT SYSTEM FOR A MOTOR VEHICLE

[75] Inventor: Herbert Zimmer, Regensburg, Germany

[73] Assignee: Siemens Aktiengesellschaft, Munich, Germany

[21] Appl. No.: 09/013,296

[22] Filed: Jan. 26, 1998

Related U.S. Application Data

[63] Continuation of application No. PCT/EP96/02712, Jun. 21, 1996.

[30] Foreign Application Priority Data

Jul. 24, 1995 [DE] Germany ............................. 95111629

[51] Int. Cl.[7] .................................................. G60R 25/10
[52] U.S. Cl. .............. 340/426; 340/825.31; 340/825.34; 340/825.69; 70/277; 342/44
[58] Field of Search ............................. 340/426, 825.31, 340/825.54, 825.34, 825.69, 905, 902; 70/277; 307/10.5, 10.3, 10.4; 342/44

[56] References Cited

U.S. PATENT DOCUMENTS

| | | | |
|---|---|---|---|
| 4,918,955 | 4/1990 | Kimura et al. ............................. | 70/277 |
| 4,937,795 | 6/1990 | Motegi et al. ............................. | 367/93 |
| 5,053,774 | 10/1991 | Schuermann et al. ..................... | 342/42 |
| 5,287,112 | 2/1994 | Schuermann ............................... | 342/44 |
| 5,319,364 | 6/1994 | Waraksa et al. .................... | 340/825.72 |
| 5,614,891 | 3/1997 | Zeinstra et al. ..................... | 340/825.22 |
| 5,616,966 | 4/1997 | Fischer et al. .......................... | 307/10.5 |
| 5,635,923 | 6/1997 | Steele et al. ............................ | 340/905 |
| 5,724,028 | 3/1998 | Prokup ............................... | 340/825.31 |
| 5,804,888 | 9/1998 | Murr et al. ............................ | 307/10.2 |

FOREIGN PATENT DOCUMENTS

| | | |
|---|---|---|
| 0568398A2 | 11/1993 | European Pat. Off. . |
| 4317119A1 | 11/1994 | Germany . |
| 93/23908 | 11/1993 | WIPO . |

*Primary Examiner*—Edward Lefkowitz
*Assistant Examiner*—Davetta W. Goins
*Attorney, Agent, or Firm*—Herbert L. Lerner; Laurence A. Greenberg; Werner H. Stemer

[57] ABSTRACT

An antitheft system for a motor vehicle includes a transponder having a charging capacitor which is wirelessly charged by energy signals from a transceiver. The level of the energy being transmitted depends on the quality of an inductive transmission between the transponder and the transceiver. Too little energy is transmitted if the exciting frequency of a transceiver oscillating circuit does not correspond to its resonant frequency due to component tolerances. In order to ensure that the charging capacitor is always quickly and properly charged, the exciting frequency is varied within a predetermined frequency range during a charging phase so that it passes in the vicinity of the resonant frequency at least once.

12 Claims, 4 Drawing Sheets

FIG.2c
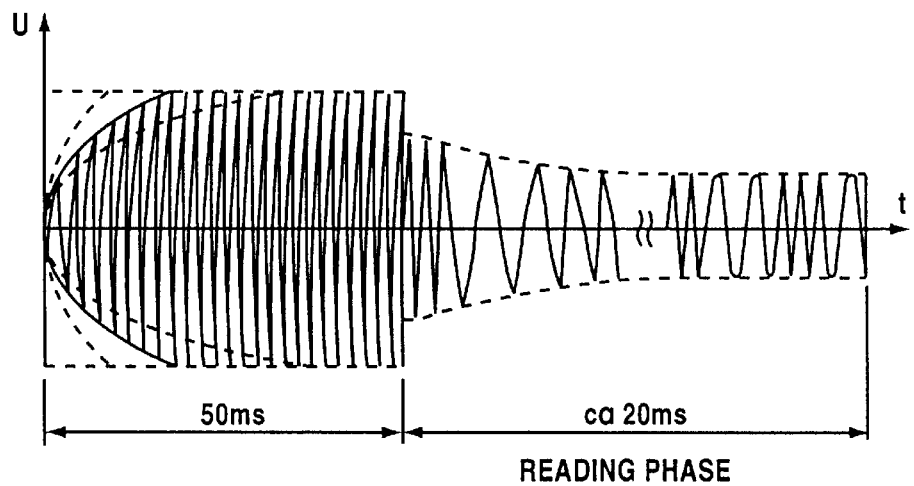
FIG.2d
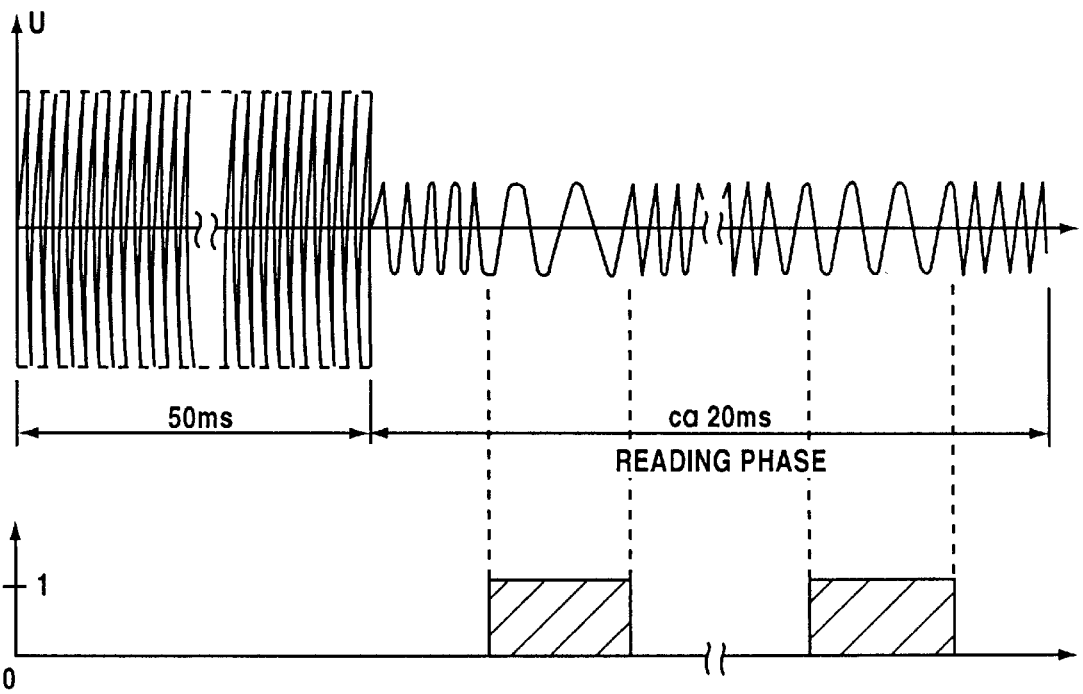
FIG.2e

ANTITHEFT SYSTEM FOR A MOTOR VEHICLE

CROSS-REFERENCE TO RELATED APPLICATION

This application is a continuation of International Application Ser. No. PCT/EP96/02712, filed Jun. 21, 1996, which designated the United States.

BACKGROUND OF THE INVENTION

FIELD OF THE INVENTION

The invention relates to an antitheft system for a motor vehicle. In particular, the invention relates to a lock system by which an immobilizer of the motor vehicle is enabled.

An antitheft system which is known from U.S. Pat. No. 5,053,774 has a portable transponder that receives an inquiry code signal from a stationary transceiver. After the inquiry code signal has been received, a reply code signal is sent back to the transceiver. Energy which is used to trigger the reply code signal is also transmitted in the inquiry code signal. The energy is temporarily stored in an accumulator. If sufficient energy is present in the accumulator, the code signal is triggered.

If the transponder and the transceiver are poorly coupled to one another, it may, under certain circumstances, be a very long time until the accumulator is charged.

SUMMARY OF THE INVENTION

It is accordingly an object of the invention to provide an antitheft system for a motor vehicle, which overcomes the hereinafore-mentioned disadvantages of the heretofore-known devices of this general type and which charges an energy accumulator in a transponder reliably and quickly, so that a reply code signal (referred to below as a code signal) can be transmitted immediately after reception of an inquiry code signal.

With the foregoing and other objects in view there is provided, in accordance with the invention, an antitheft system, in particular for a motor vehicle, comprising a stationary unit having a first oscillating circuit with an antenna; a portable unit having a second oscillating circuit with a coil, and an energy accumulator connected to the second oscillating circuit; and an oscillator oscillating with an oscillator frequency and having an output variable used as exciting variable with an exciting frequency for causing an oscillation of the first oscillating circuit, the exciting frequency changing for a first, predetermined period of time within a predetermined frequency range as soon as an energy supply of the stationary unit is switched on, to transmit energy signals inductively from the antenna to the coil, for at least partially charging the energy accumulator of the portable unit.

In this case, a reliable coupling between the transponder and the transceiver is obtained by varying the exciting frequency of the inquiry code signal.

In accordance with another feature of the invention, the stationary unit is a transceiver disposed in a motor vehicle; the portable unit is a portable transponder having an item of code information, the transponder modulates the oscillation of the first oscillating circuit within a second, predetermined period of time as a function of the code information of the first oscillating circuit as soon as the energy accumulator is at least partially charged, for supplying the transponder with energy from the energy accumulator; and an evaluation unit receives the oscillation of the first oscillating circuit, senses the modulated oscillation, demodulates the code information from the modulated oscillation, compares the code information with an item of reference code information in a comparator and transmits an enable signal for a security assembly upon a correspondence between the code information and the reference code information.

In accordance with a further feature of the invention, the exciting frequency is changed within the predetermined frequency range in prescribed increments.

In accordance with an added feature of the invention, the exciting frequency is changed continuously within the predetermined frequency range.

In accordance with an additional feature of the invention, the first oscillating circuit of the transceiver has a resonant frequency changing at every exciting frequency in prescribed increments.

In accordance with yet another feature of the invention, there is provided an adjustable frequency divider changing the exciting frequency.

In accordance with yet a further feature of the invention, there is provided a generator having a variable control parameter, the oscillator changing the exciting frequency, and the output variable of the oscillator depending upon the variable control parameter of the generator.

In accordance with yet an added feature of the invention, the transponder is disposed on an ignition key, and the transceiver receives the energy supply upon turning the ignition key in an ignition lock.

In accordance with yet an additional feature of the invention, the exciting frequency is changed only within a predetermined period of time after the energy supply is switched on.

In accordance with again another feature of the invention, there is provided a coil inductively coupling the transponder to the antenna.

In accordance with a concomitant feature of the invention, the security assembly is a door lock or an immobilizer.

Other features which are considered as characteristic for the invention are set forth in the appended claims.

Although the invention is illustrated and described herein as embodied in an antitheft system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 2a to 2e are pulse diagrams of a transponder and of a transceiver of the antitheft system;

DESCRIPTION OF THE PREFERRED EMBODIMENTS

Figure 1:
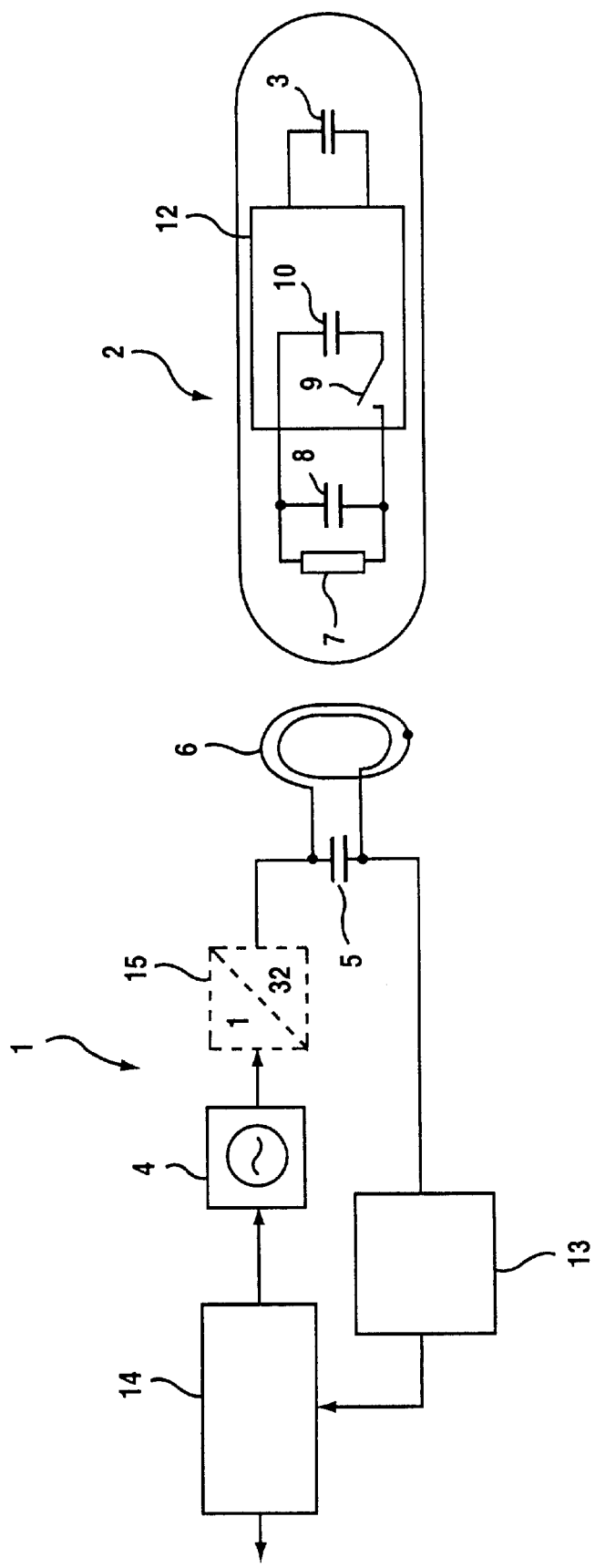
FIG. 1 is a schematic and block circuit diagram of an antitheft system according to the invention.

Referring now to the figures of the drawings in detail and first, particularly, to FIG. 1 thereof, there is seen an antitheft system according to the invention that has a stationary unit in the form of a transceiver 1 which is disposed in a motor vehicle and which interacts with a portable unit or transponder 2 through a transformer coupling if the transponder 2 is in the vicinity of the transceiver 1. The transceiver 1 produces an alternating field through the use of which energy is transmitted to the transponder 2 so that an accumulator or capacitor (charging capacitor 3) in the transponder 2 is charged thereby. If sufficient energy is charged in the charging capacitor 3, the transponder 2 is activated and code signals are transmitted back to the transceiver 1.

In order to transmit energy and transmit back data, the transceiver 1 has an oscillating circuit (referred to below as an antenna oscillating circuit) which is made to oscillate with the aid of an oscillator 4. To this end, the antenna oscillating circuit has at least one antenna capacitor 5 and a coil (antenna 6). The antenna 6 can, for example, be wound around an ignition lock.

The transponder 2 also has an oscillating circuit (referred to below as a transponder oscillating circuit) with a coil 7 and a transponder capacitor 8. If the antenna 6 and the coil 7 are in the direct vicinity of one another, an inductive coupling and thus a transmission of data or energy, take place. This is the case, for example, when the transponder 2 is disposed on an ignition key. As soon as the ignition key is plugged into the ignition lock and the ignition key is turned, the antenna 6 and the coil 7 are electrically coupled to one another.

The oscillation of the antenna oscillating circuit 5, 6 is modulated by the transponder 2 in clock synchronism with an item of code information. To this end, the transponder 2 has a switch 9 which connects an additional capacitor 10 to the transponder capacitor 8 of the transponder oscillating circuit 7, 8 in clock synchronism with the code information. However, the modulation does not take place until the charging capacitor 3 is sufficiently charged with energy in order to switch the switch 9 in clock synchronism with the code information.

In this context, the switch 9 is controlled by a transponder control unit (transponder IC 12) which may be constructed as an integrated circuit.

Figure 2A:
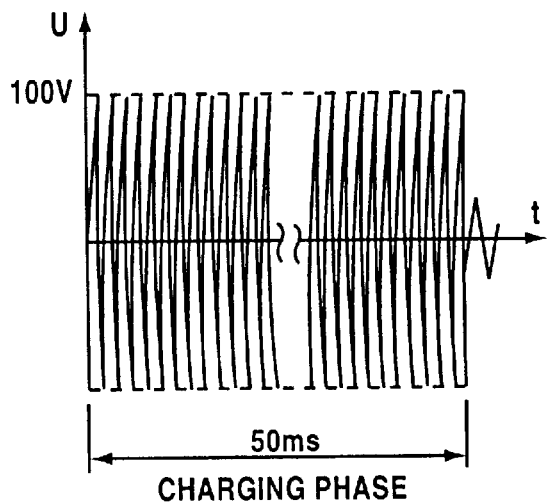
Figure 2B:
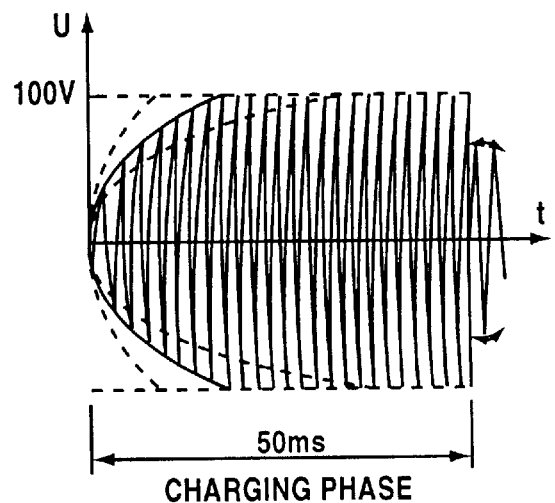

As soon as the ignition key is turned in the ignition lock, the transceiver 1 produces an alternating field with a high field strength (energy signals shown in FIG. 2a). The energy signals, which in this case are approximately 50 ms long, for example, are produced within a predetermined time period (charging phase) and they have an amplitude of approximately 100 V. These energy signals charge the charging capacitor 3 at different speeds (as shown in FIG. 2b) depending on the quality of the coupling between the transponder 2 and the transceiver 1, i.e. depending on the received field strength.

When the transmission of the energy signals has been terminated, the charging capacitor 3 should largely be charged. The transponder 2 detects the switching off of the energy signals, since the transceiver 1 then produces an alternating field with only a low field strength (of the order of magnitude of a few mV). Then, the switch 9 is switched within a further predetermined period of time (reading phase) in clock synchronism with the code information and thus produces the code signal (shown in FIG. 2c). The code signal is a signal with a low amplitude, for example of approximately 1 mV, and is present for approximately 20 ms. The amplitude of the code signal decreases continuously, since the charging capacitor 3 supplies the energy for switching the switch, and is consequently continuously discharged.

The code signal reacts on the antenna oscillating circuit 5, 6, since the antenna 6 and the coil 7 are inductively coupled to one another. As a result, the oscillation of the antenna oscillating circuit 5, 6 is modulated (as shown in FIG. 2d). Since the additional capacitor 10 is connected to, and disconnected from, the transponder capacitor 8, the antenna oscillating circuit 5, 6 is loaded to differing degrees and consequently the oscillation of the antenna oscillating circuit 5, 6 is modulated in terms of its frequency.

With an assumed average exciting frequency $f_E$ of 129 kHz at which the antenna oscillating circuit 5, 6 is excited, the oscillation frequency of the antenna oscillating circuit 5, 6 changes, for example from 123 kHz to 134 kHz, due to the frequency modulation by the code signal.

The modulated oscillation of the antenna oscillating circuit 5, 6 is sensed by a demodulator 13 and evaluated in a control and evaluation unit 14. To this end, the period lengths or the frequencies of the modulated oscillation are measured. If the frequency of the modulated oscillation lies below a threshold value of, for example, 129 kHz, a high level of the modulated signal is detected, and if the frequency lies above 129 kHz, a low level is detected (as shown in FIG. 2e). In this way, the code information of the transponder 2 is demodulated from the modulated oscillation.

The code information is compared with an item of prescribed reference code information in the control or evaluation unit 14. If the two correspond, an enable signal is transmitted to a security assembly in the motor vehicle. Such a security assembly may be, for example, a door lock or an immobilizer. If the code signal is authorized and correct, the door lock is unlocked or the immobilizer is deactivated, so that it is possible to start the engine.

The antenna oscillating circuit 5, 6 is made to oscillate with the exciting frequency $f_E$ by the oscillator 4, through the use of an exciting variable. The exciting variable which is used can be the output voltage or the output current of the oscillator 4. The oscillator 4 oscillates with an oscillator frequency $f_O$. A frequency divider 15, which divides down the oscillator frequency $f_O$ to the desired exciting frequency $f_E$, may be additionally disposed between the oscillator 4 and the antenna oscillating circuit 5, 6.

The exciting variable gives rise to a steady-state, forced oscillation of the antenna oscillating circuit 5, 6, which then oscillates with the exciting frequency $f_E$. Each oscillating circuit has a standard frequency, also referred to as resonant frequency $f_R$, which is determined by the components of the oscillating circuit, i.e. essentially by the antenna 6 and the antenna capacitor 5. The generated intensity (field strength/amplitude) of the oscillation is greatest when the oscillating circuit is excited with the exciting frequency $f_E$ that is equal to the resonant frequency $f_R$ (a working point $P_i$ of the oscillating circuit is then at a resonance point $P_0$; in this respect see FIG. 3). In this case, most energy is transmitted to the transponder 2, so that the charging capacitor 3 can be charged quickly.

Figure 3:
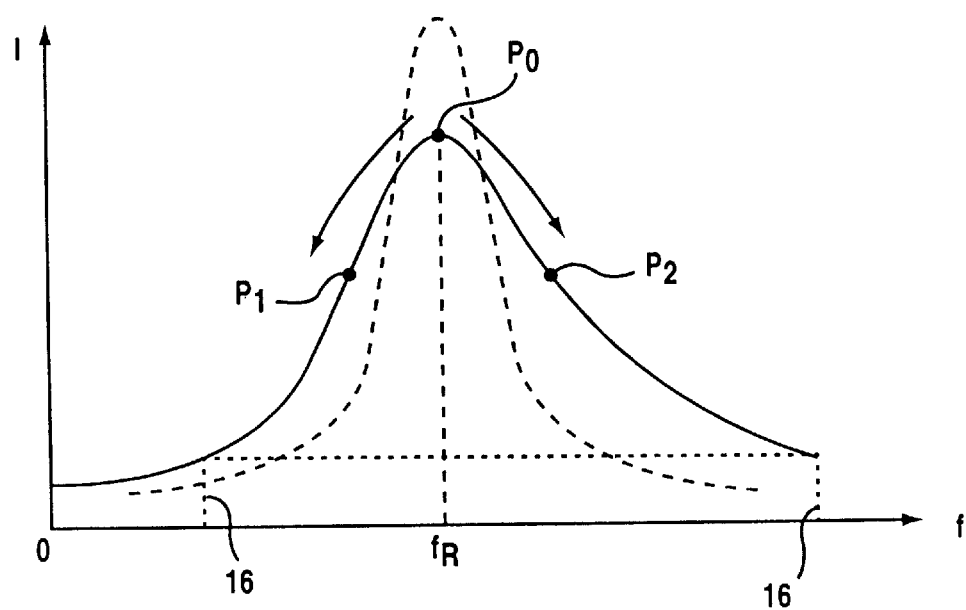
FIG. 3 is a graph of a resonance curve of an oscillating circuit.

The power balance is illustrated with reference to a resonance curve shown in FIG. 3, in which the frequency f is entered on the abscissa (x axis) and the oscillation intensity I due to the exciting variable, i.e. the amplitude of the exciting voltage or of the exciting current, is entered on the ordinate (y axis). If the exciting frequency $f_E$ (working point $P_i$) deviates from the resonant frequency $f_R$, the intensity I of the oscillation becomes smaller and less energy is transmitted to the transponder 2. A working point $P_i$ is then adopted if the exciting frequency $f_E$ equals the resonant frequency $f_R$. The working points are located at lower intensities I (seen at working points $P_1$ or $P_2$) depending on the difference between the two frequencies.

If the working point lies below a power limit 16 determined in advance, too little field energy reaches the transponder 2. For this reason, the charging capacitor 3 can no longer be charged as quickly, or cannot be charged sufficiently, because the transmitted energy is too low. The transponder 2 then no longer modulates the antenna oscillating circuit 5, 6 or terminates the modulation after it has started.

When such an antitheft system is constructed, it is ensured that the exciting frequency $f_E$ largely corresponds to the resonant frequency $f_R$. However, due to component tolerances both in the transceiver 1 and in the transponder 2, the resonant frequency $f_R$ and the exciting frequency $f_E$ may deviate from one another, so that optimum transmission of energy to the transponder 2 does not take place. Even when there are small deviations between the two frequencies, a considerable reduction in the intensity (field strength) of the transmitted alternating field may take place with high-quality oscillating circuits (narrow quality curve indicated by dashed lines in FIG. 3).

An optimum power balance would then be obtained if the components of the oscillating circuits and of the oscillator 4 were to be selected in such a way that they exhibit only slight deviations from the reference values and consequently the same conditions then always prevail. However, in order to achieve this, a very high expenditure must be made. External influences, such as temperature fluctuations, can also influence the components so that the conditions change quickly. Thus, it may be found that the maximum energy is not transmitted.

In order to ensure that the charging capacitor 3 is always charged reliably and completely, according to the invention the exciting frequency $f_E$ is varied, at least in the charging phase. As soon as the transponder 2 is turned with the ignition key in the ignition lock, the energy of the oscillator 4 is switched on. The oscillator 4 starts to oscillate at the prescribed frequency $f_O$. The exciting frequency $f_E$, which may be equal to the oscillator frequency $f_O$, is changed within the charging phase in a prescribed frequency range. This is sufficient for the working point of the maximum transmission of energy (see FIG. 3) to be reached approximately at least once, in order to charge the charging capacitor 3 sufficiently.

In this case, the exciting frequency $f_E$ can be changed in prescribed increments within the predetermined frequency range. For example, the exciting frequency $f_E$ can be changed from 129 kHz±3% (the predetermined frequency range being 129 kHz±3%) in increments of 500 Hz.

The exciting frequency $f_E$ can also be changed continuously within the predetermined frequency range.

In addition, it is possible to change the resonant frequency $f_R$ of the antenna oscillating circuit 5, 6 at every exciting frequency $f_E$ in predetermined increments. To this end, different impedances can be connected to, or disconnected from, the antenna oscillating circuit 5, 6 at each exciting frequency $f_E$, as a result of which the resonant frequency $f_R$ is changed with respect to the exciting frequency $f_E$.

Figure 4:
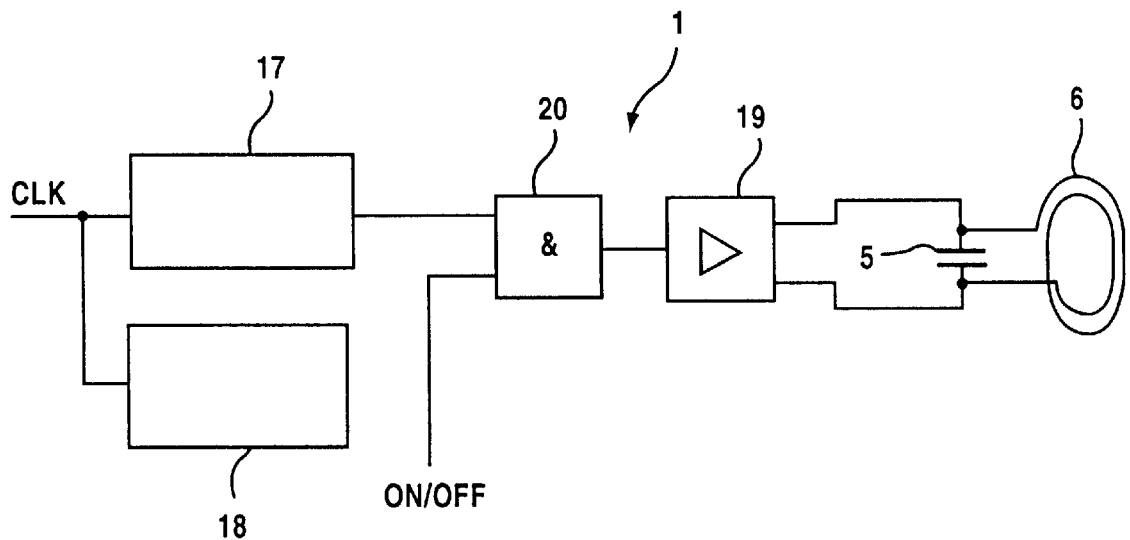
FIG. 4 is a schematic and block diagram of a first exemplary embodiment for generating an oscillation.

A circuit configuration for changing the exciting frequency $f_E$ in predetermined steps is illustrated in FIG. 4. In this case, a driver 17 is operated in clocked operation by a clock frequency CLK. A frequency sequence control unit 18 prescribes the frequency increments with which the programmable driver 17 is to be operated. As soon as the ignition key is turned in the ignition lock, i.e. as soon as the energy supply is switched on (with an ON/OFF signal which is fed through an AND gate 20 in FIGS. 4 and 5), the antenna oscillating circuit 5, 6 is excited with the prescribed exciting frequency $f_E$ through an amplifier 19.

Figure 5:
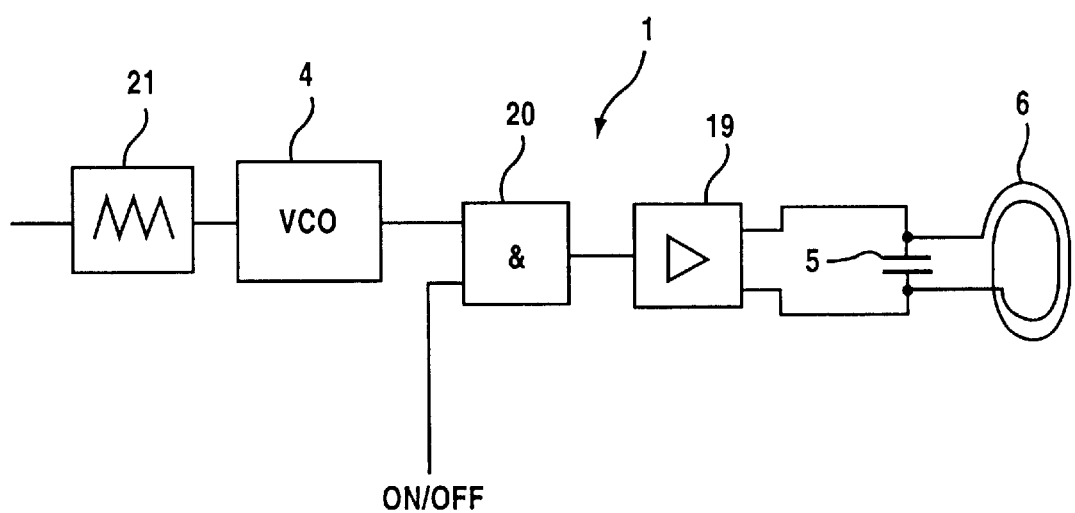
FIG. 5 is a schematic and block circuit diagram of a second exemplary embodiment.

The exciting frequency $f_E$ can also be continuously changed by using a voltage-controlled oscillator 4 (VCO) shown in FIG. 5. To this end, a suitable control signal (saw-tooth voltage of a saw-tooth signal generator 21) is applied to an input of the oscillator 4.

The antenna oscillating circuit 5, 6 is configured in the exemplary embodiments, as determined by its components, in such a way that its resonant frequency $f_R$ is approximately 129 kHz. The oscillator frequency $f_O$ can be approximately 4 MHz, for example. In order to ensure that the oscillator 4 can also be used to excite the oscillating circuit, a 1/32 frequency divider 15 is disposed between the oscillator 4 and the antenna oscillating circuit 5, 6, as is seen in FIG. 1. This results in an exciting frequency $f_E$ of approximately 129 kHz.

The exciting frequency $f_E$ can be changed by changing the oscillator frequency $f_O$ by a prescribed value, so that a working point, at which approximately maximum energy is transmitted, is obtained at least once. As a result, it is thus ensured that sufficient energy is transmitted to the transponder 2 and that the charge capacitor 3 is charged reliably and quickly.

A digital frequency divider, which divides the oscillator frequency $f_O$ down to the exciting frequency $f_E$, can also be used instead of a fixed frequency divider 15. Such a digital frequency divider has an infinitely adjustable divider ratio.

The control unit or evaluation unit 14 can be realized through the use of a microprocessor or through the use of a functionally equivalent circuit configuration. For this reason, the function of the demodulator 13 can also be performed by the microprocessor. The reference code information with which the code information supplied by the transponder 2 is compared, is stored in a memory (ROM, EEPROM) which is not illustrated.

The code information can also be stored in such memories in the transponder 2.

It may also be provided that the exciting frequency $f_E$ continuously changes within the charging phase but the frequency range is not prescribed, instead the exciting frequency $f_E$ changes until the predetermined period of time of the charging phase has finished. It is therefore not a case of passing through a fixed frequency range but rather of merely changing the frequency for a period of time.

In the exemplary embodiments, the charging phase lasts approximately 50 ms. Within this period of time, according to the invention the exciting frequency $f_E$ changes and within this period of time the charging capacitor 3 is charged inductively by the transceiver 1.

The exciting frequency $f_E$ can also pass through the predetermined frequency range repeatedly, so that a working point with maximum oscillation intensity I is reached a plurality of times. The predetermined frequency range and the period of time for which the energy signal is transmitted to the transponder 2, depends on the magnitude of the charging capacitor 3 and on the energy required in the transponder 2.

The switch 9 can also be realized through the use of an integrated circuit which also contains the additional capacitor 10. The switch 9 and the additional capacitor 10 can also be contained in the transponder, in the IC 12. An inductor may also be connected instead of the additional capacitor 10. However, the only significant factor for the invention is that the transponder oscillating circuit 7, 8 is changed as a function of the code information and as a result the oscillation of the antenna oscillating circuit 5, 6 is modulated. A frequency modulation, amplitude modulation or pulse-width modulation may be used therefor.

I claim:

1. An antitheft system, comprising:

a stationary unit having a first oscillating circuit with an antenna;

a portable unit having a second oscillating circuit with a coil, and an energy accumulator connected to said second oscillating circuit; and an oscillator oscillating with an oscillator frequency and having an output variable used as exciting variable with an exciting frequency for causing an oscillation of said first oscillating circuit, the exciting frequency changing for a first, predetermined period of time within a predetermined frequency range as soon as an energy supply of said stationary unit is switched on, to transmit energy signals inductively from said antenna to said coil, for at least partially charging said energy accumulator of said portable unit.

2. The antitheft system according to claim 1, wherein:

said stationary unit is a transceiver disposed in a motor vehicle;

said portable unit is a portable transponder having an item of code information, said transponder modulates the oscillation of said first oscillating circuit within a second, predetermined period of time as a function of the code information of said first oscillating circuit as soon as said energy accumulator is at least partially charged, for supplying said transponder with energy from said energy accumulator; and an evaluation unit receives the oscillation of said first oscillating circuit, senses the modulated oscillation, demodulates the code information from the modulated oscillation, compares the code information with an item of reference code information in a comparator and transmits an enable signal for a security assembly upon a correspondence between the code information and the reference code information.

3. The antitheft system according to claim 1, wherein the exciting frequency is changed within the predetermined frequency range in prescribed increments.

4. The antitheft system according to claim 1, wherein the exciting frequency is changed continuously within the predetermined frequency range.

5. The antitheft system according to claim 2, wherein said first oscillating circuit of said transceiver has a resonant frequency changing at every exciting frequency in prescribed increments.

6. The antitheft protection system according to claim 1, including an adjustable frequency divider changing the exciting frequency.

7. The antitheft system according to claim 3, including a generator having a variable control parameter, said oscillator changing the exciting frequency, and the output variable of said oscillator depending upon the variable control parameter of said generator.

8. The antitheft system according to claim 2, wherein said transponder is disposed on an ignition key, and said transceiver receives the energy supply upon turning the ignition key in an ignition lock.

9. The antitheft system according to claim 1, wherein the exciting frequency is changed only within a predetermined period of time after the energy supply is switched on.

10. The antitheft system according to claim 1, including a coil inductively coupling said transponder to said antenna.

11. The antitheft system according to claim 2, wherein the security assembly is a door lock.

12. The antitheft system according to claim 2, wherein the security assembly is an immobilizer.

* * * * *